(12) United States Patent
Queveau et al.

(10) Patent No.: US 7,080,873 B2
(45) Date of Patent: Jul. 25, 2006

(54) CONTROL DEVICE FOR TILTING A MOVABLE ROOF ON A CONVERTIBLE VEHICLE

(75) Inventors: Paul Queveau, Montravers (FR); Gerard Queveau, Le Pin (FR); Jean-Marc Guillez, Cirieres (FR)

(73) Assignee: Heuliez, Cerizay (FR)

( * ) Notice: Subject to any disclaimer, the term of this patent is extended or adjusted under 35 U.S.C. 154(b) by 53 days.

(21) Appl. No.: 10/996,252

(22) Filed: Nov. 23, 2004

(65) Prior Publication Data

US 2006/0001289 A1 Jan. 5, 2006

(30) Foreign Application Priority Data

Jul. 2, 2004 (FR) .................................. 04 07418

(51) Int. Cl.
*B60J 10/10* (2006.01)
(52) U.S. Cl. .................... 296/107.17; 296/108
(58) Field of Classification Search ........... 296/107.17, 296/108, 117
See application file for complete search history.

(56) References Cited

U.S. PATENT DOCUMENTS

| | | | |
|---|---|---|---|
| 3,059,962 A | 10/1962 | Harms et al. | |
| 5,490,709 A * | 2/1996 | Rahn | 296/108 |
| 5,806,912 A * | 9/1998 | Ramaciotti et al. | 296/107.09 |
| 6,039,383 A * | 3/2000 | Jambor et al. | 296/108 |
| 6,419,296 B1 * | 7/2002 | Dintner et al. | 296/107.18 |
| 6,659,534 B1 * | 12/2003 | Willard | 296/107.17 |
| 6,702,362 B1 * | 3/2004 | Eichholz et al. | 296/108 |
| 6,729,672 B1 * | 5/2004 | Neubrand | 296/107.07 |
| 6,796,597 B1 * | 9/2004 | Mac Farland | 296/107.17 |
| 6,837,533 B1 * | 1/2005 | Wojciech et al. | 296/107.17 |
| 6,866,325 B1 * | 3/2005 | Willard | 296/107.17 |
| 6,921,122 B1 * | 7/2005 | Obendiek et al. | 296/107.17 |
| 2002/0125733 A1 | 9/2002 | Kinnanen | |
| 2004/0145212 A1 * | 7/2004 | Mac Farland | 296/108 |

FOREIGN PATENT DOCUMENTS

DE 40 10 276 A1 10/1990

* cited by examiner

*Primary Examiner*—Kiran B. Patel
(74) *Attorney, Agent, or Firm*—Bachman & LaPointe

(57) ABSTRACT

This invention relates to a control device for tilting for at least one movable roof panel for a convertible vehicle comprising a structural body, a passenger compartment and at least two seats side by side arranged in this passenger compartment on each side of a vertical longitudinal plane of the vehicle. The control device comprises an actuator arranged and acting approximately in this vertical longitudinal plane. The actuator is connected to the roof panel to tilt it.

19 Claims, 4 Drawing Sheets

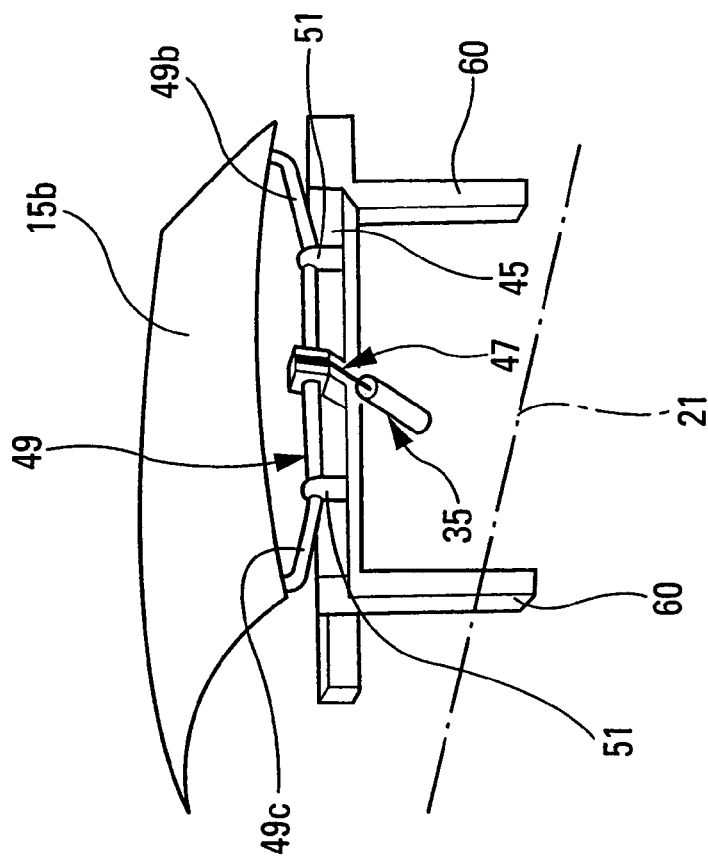
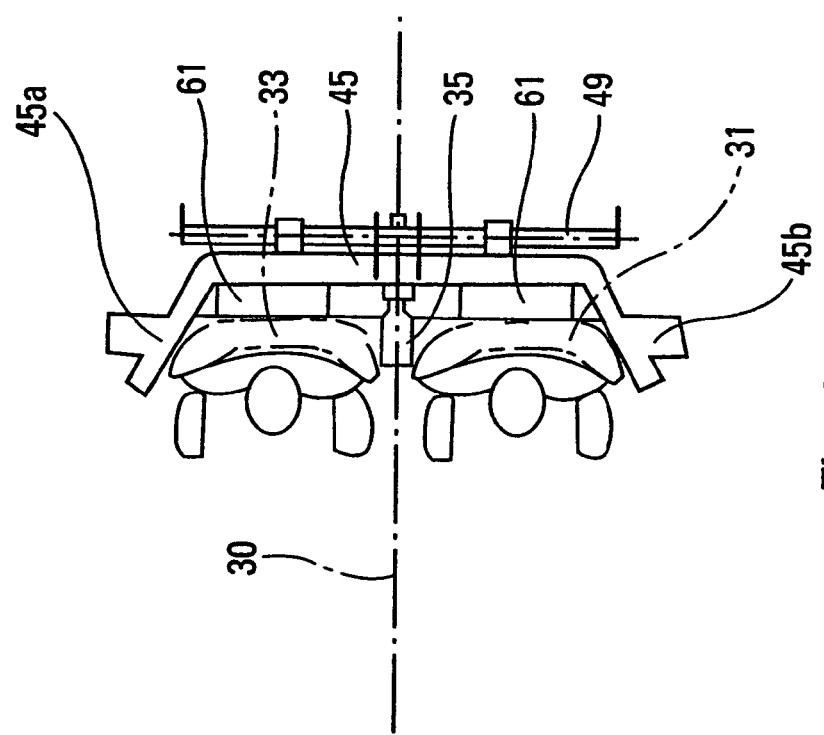

CONTROL DEVICE FOR TILTING A MOVABLE ROOF ON A CONVERTIBLE VEHICLE

BACKGROUND OF THE INVENTION

The invention relates to the tilting control for at least one movable, or mobile, roof panel for a convertible vehicle.

Different examples of convertible vehicles are known, in other words vehicles with a roof comprising at least one movable panel such that this roof can be at least partly opened.

These vehicles include particularly roadsters or convertible coupés, or convertible vehicles (for example convertible saloons) with at least two rows of seats.

An example of such vehicles is given in WO-A-01/62533.

Based on existing solutions, one purpose of the invention is to propose a solution to the problem of the size of drive or control systems for this (these) roof panel(s) by proposing a reliable, high performance and economic solution that can be made in production series, in which there is an articulation movement of the required amplitude within a limited space, without occupying excessive space that would otherwise be reserved for other applications (passenger compartment, baggage storage area, etc.).

SUMMARY OF THE INVENTION

In this context, the invention firstly proposes a control device for tilting at least one such a mobile roof panel for a convertible vehicle comprising a structural body (or bodywork), a passenger compartment and at least two seats side by side arranged in this passenger compartment on each side of a vertical longitudinal plane of the vehicle, the said roof comprising at least one such panel that extends transverse to this vertical longitudinal plane, and the control device comprises an actuator arranged and acting approximately in this vertical longitudinal plane, this actuator therefore being connected to said roof panel to tilt it (relative to said so-called structural body or bodywork).

Advantageously, there will be a single actuator and the vertical longitudinal plane will be the median plane of the vehicle, which is the reason why it is more compact than previous embodiments, saving space.

For similar reasons, it is recommended that the actuator should be arranged between the two seats, approximately at the seat back.

To facilitate a robust articulation with a rotation that can make the roof panel concerned tilt quickly, it is also recommended that:

the actuator should include a cylinder and a rod sliding with respect to the cylinder, the cylinder being connected to the structural body of the vehicle, the sliding rod being connected articulated to an intermediate drive device connected to the said roof panel to drive it in rotation, and it is exclusively moved in rotation about an axis transverse to the said vertical longitudinal plane of the vehicle, and preferably that the articulated connection between the sliding rod of the actuator and the intermediate rotational drive device of the said roof panel should be provided by at least one rod provided with at least one trunnion extending transverse to the said vertical longitudinal plane of the vehicle, this trunnion being arranged free to slide in a slide fixed in position with respect to the structural body and curved to transform the sliding movement of the actuator rod into a tilting movement applied to the intermediate rotational drive device of the roof panel concerned.

To make it even more compact, and to provide precise guidance and strength, the intermediate rotational drive device of the said roof panel will advantageously include a tube extending generally transverse to the vertical longitudinal plane of the vehicle.

To facilitate these articulations without hindering control of the actuator, it is also recommended that the actuator cylinder should be installed articulated free to rotate about the structural body of the vehicle about a second axis transverse to the vertical longitudinal plane of the vehicle.

Once again for reasons of compactness and to provide reliable, precise and dependable guidance, it is also recommended that the actuator cylinder should be fixed to a guide part with respect to which it is installed free to pivot about the said second transverse axis, this guide part including the slide (each slide) that guides the trunnion(s) of the connecting rod (each connecting rod).

Typically, on a vehicle with a fully retractable roof such as a convertible, the roof will advantageously include at least two roof panels.

In this preferred application, it is recommended that the second roof panel (typically the forward roof panel when the roof is in the closed state above the passenger compartment) the first and second roof panels having a front edge and a rear edge respectively, the second roof panel is connected to its rear edge and articulated to the front edge of the said first roof panel, along a third axis transverse to the vertical longitudinal plane of the vehicle, under the control of the central actuator, to achieve all or some of the above mentioned purposes.

In this configuration, it is also recommended that the second roof panel should be connected to the structural body of the vehicle through at least one pivoting arm articulated on it at one end and on part of the structural body at a second end, about fourth and fifth rotation axes respectively transverse to the said longitudinal plane of the vehicle.

Still for reasons of compactness and for efficiency in the movement applied by the central actuator, it is also recommended in particular that if the first roof panel is a rear transverse panel of the rear quarter panel and therefore contains a back window, the tube driven in rotation by the actuator should be installed near the back of this first roof panel.

Apart from the control device that has just been presented, the invention relates particularly to a convertible vehicle for which the roof is free to move between a closed position above the passenger compartment and an open position reached when the roof is retracted towards the back of the passenger compartment, obviously, this vehicle being provided with a control device specific to the invention.

On this type of vehicle, it is recommended that the intermediate drive device controlled in rotation by the actuator should be fixed by stirrups behind each seat to a structural beam that forms part of the structural body of the vehicle and extends along a sixth axis transverse to the vertical longitudinal plane of the vehicle.

The result is combined reliability and efficiency in the control of roof movements and mechanical strength/stiffness provided by the structural body of the vehicle.

Within this context, it is also recommended that the arm to which the second roof panel is connected through articulations should be connected through another articulation at its second end to a side prolongation bent towards the front of the said structural beam, this prolongation thus extending close to a side of the vehicle close to an outer side of the seat concerned.

For passenger safety, considering the roof control system mentioned above, it is also recommended that the structural beam mentioned above should be fixed to a hollow box bearing on a structural underframe forming part of the structural body of the vehicle and in which a protection reinforcement is arranged for vehicle occupants, this reinforcement being installed free to slide vertically with respect to the hollow box between a low position in which the reinforcement is at least partly retracted in the box, and a high position in which it projects at least partly above this box, behind the corresponding seat.

Other characteristics and advantages of the invention will become clear during the more detailed description given below with reference to the appended figures given solely as non-limitative examples (although they represent a precise tilting control system for at least one movable roof panel).

BRIEF DESCRIPTION OF THE DRAWINGS

In the attached drawings:

FIG. 4 is a complete top view (arrow IV in FIG. 2), to the right of the median plane of the vehicle (small scale), and FIG. 5 shows another small scale perspective view, particularly the transverse beam to which the pivoting panel directly controlled in rotation by the actuator is connected.

DETAILED DESCRIPTION OF THE PREFERRED EMBODIMENT(S)

Figure 1:
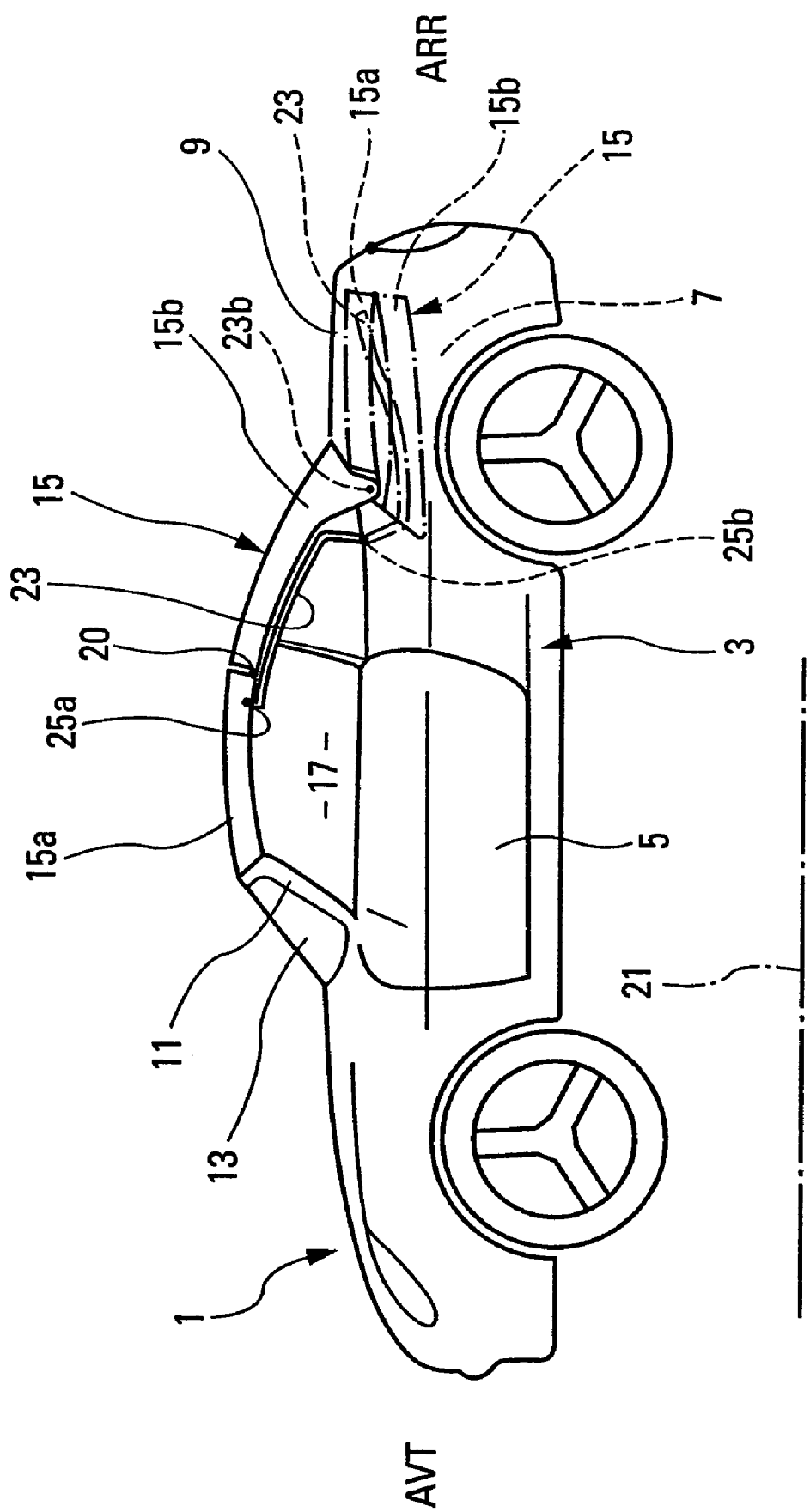
FIG. 1 diagrammatically shows a side view of a vehicle to which the control device according to the invention is applicable.

FIG. 1 shows a vehicle 1 including a structural body 3, also called the vehicle body or body structure or bodywork, that in this case includes doors such as 5, a boot 9 and a front structural body part 11, in particular delimiting a windshield 13.

The illustrated vehicle 1 is a convertible coupé with a roof 15 that fully retracts into the baggage compartment 7 at the back of the passenger compartment 17.

Thus, the retractable roof 15 is articulated on the structural body 3 such that the vehicle can be transformed into a convertible.

The roof 15 is free to move between a closed position shown in solid lines in FIG. 1 and an open folded position shown in chained dotted lines in the same figure.

In the closed position, the roof extends above the passenger compartment 17 of the vehicle that it closes at least essentially in its upper part, while in the open position, the roof is arranged behind the passenger compartment.

The roof 15 comprises several rigid, movable roof panels adapted to cover the passenger compartment 17 in their first deployed relative position (roof closed, in solid lines in FIG. 1), while they can be folded towards the others in the second open, roof stored position.

In the illustrated embodiment, the roof 15 comprises two roof rigid panels 15a, 15b, defining a front roof panel, and behind it a rear roof panel along axis 21, this relative position between the panels being the case in the roof closed position, while in the open position, one of the two roof panels is above the other, approximately horizontally, folded and behind the passenger compartment.

Obviously, the number of rigid panels in the roof 15 could be other than two.

Figure 2:
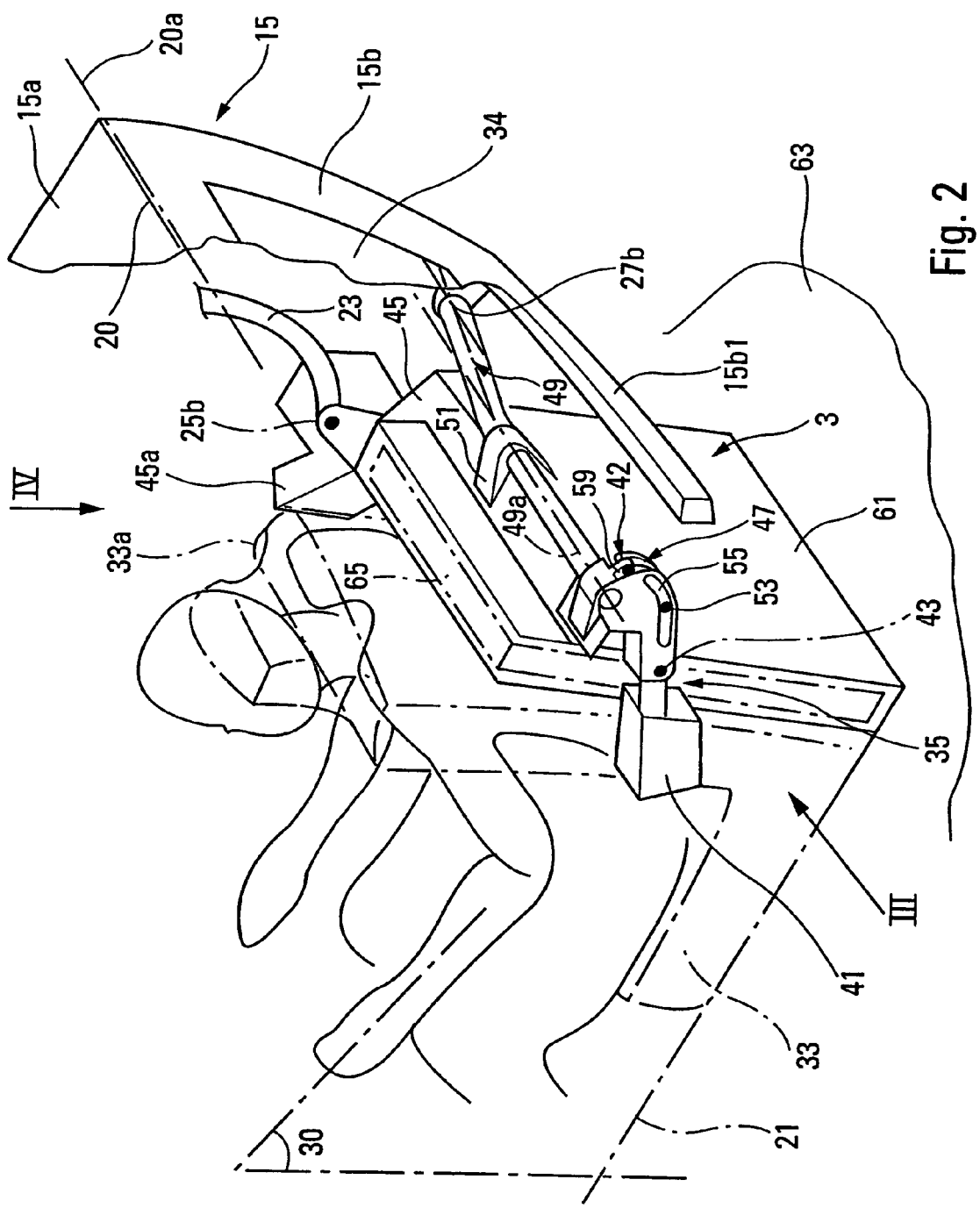
FIG. 2 shows a local internal diagrammatic perspective view of part of the vehicle close to an essential portion of the control device according to the invention, in this case near the back of the right seat of the vehicle.

Having said this, in the example illustrated the front 15a and rear 15b roof elements are connected to each other close to their rear edge and their front edge respectively, through an articulation 20. FIG. 2 shows the articulation axis between these panels as mark 20a. This axis is transverse (in this case perpendicular) to the longitudinal axis 21 of the vehicle, and to the median vertical plane 30 parallel to this axis 21. Therefore, the plane 30 globally forms the plane of symmetry on each side of which are located particularly the left seat 31 and the right seat 33 (driver and passenger) side by side, as shown in FIG. 4. Remember, that the axis 21 is perpendicular to the axle of the non-steering wheels of the vehicle.

In FIG. 1, AVT and ARR are used to identify the front and rear of the vehicle respectively, along the longitudinal axis 21.

For maneuvering by tilting, the front roof panel 15a is driven between its open and closed positions by at least one arm 23 articulated at the back of the panel around a transverse axis 25a. Transverse means any transverse axis, particularly perpendicular to the longitudinal axis 21 and/or the median vertical longitudinal plane 30.

At its other end, the arm 23 that is also seen in FIG. 2 is articulated with respect to body 3 about a transverse axis 25b.

Preferably, two arms 23 will be provided, located on each side of the roof.

One of the side points of the connection between the roof panel 15b and its tilting drive mechanism, in this case a rigid connection, is marked as 27b in FIGS. 1 and 2.

Although it could be otherwise, the panel 15b from which the tilting control of the roof assembly 15 is made, is in this case a rear panel of the rear quarter panel extending along a transverse surface, in particular perpendicular to the median longitudinal plane 30. In FIG. 2, part of the back window of the vehicle is diagrammatically represented as 34.

According to one important characteristic of the invention, an actuator 35 is used to control the roof panel 15b, the actuator being placed and acting approximately in the median vertical longitudinal plane 30 through movements of its movable part 37.

Figure 3:
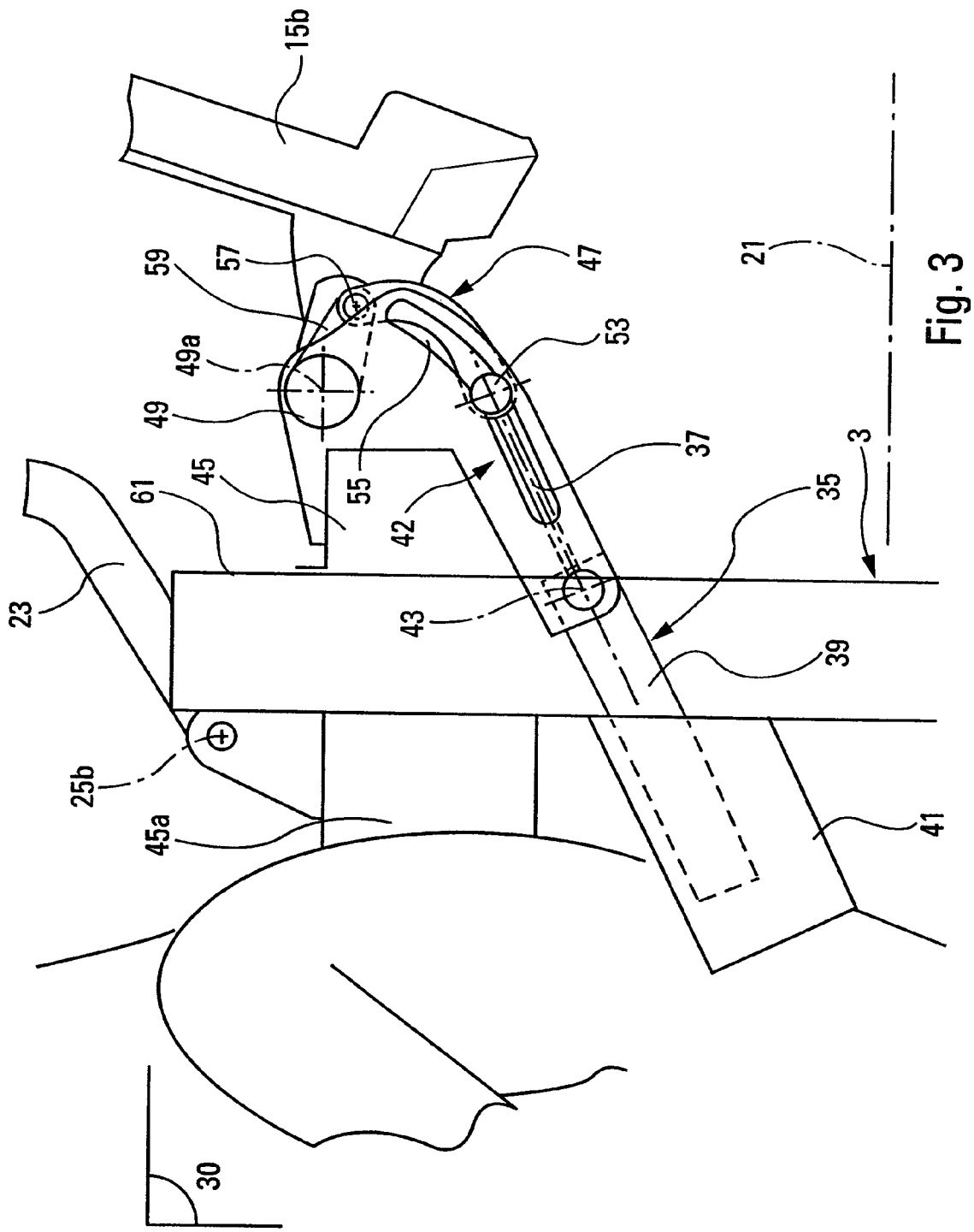
FIG. 3 is an enlarged local side view along the direction of arrow III in FIG. 2.

Possibly, for example if the row of seats concerned includes three seats side by side, the actuator 35 would extend and would then act in a vertical longitudinal plane parallel to the said median plane 30. This actuator 35 (preferably a single actuator) in this case includes a cylinder 39 and a rod (movable part 37) therefore free to slide with respect to this cylinder, approximately in the plane 30. It is advantageously located between the two seats, approximately at the seat back (FIGS. 2 to 4). Typically, it will be slightly inclined from the horizontal.

Therefore the actuator 35, and particularly its cylinder 39, are advantageously located between the back parts of the seats so that the front part projecting furthest from its cylinder can be protected in a housing 41 (FIGS. 2 and 3).

The fixed part or the cylinder 39 of the actuator 35 is connected to the structural body 3 of the vehicle, supported on a guide part 42 connected to this body.

In this case, since tilting of the panel 15b should be done quickly, the fixed part 39 of the actuator is advantageously installed articulated free to rotate with respect to body 3, about a transverse axis 43 supported by the guide part 42 that forms part of the structural body 3 since it is fixed with respect to this body, and is also firmly fixed to a structural beam 45 extending in the transverse direction (in this case approximately perpendicular) to the longitudinal axis 21 between the left and right sides of the vehicle, as can be seen in FIG. 4.

The movable part (sliding rod 37) of the actuator 35 is connected in an articulated manner through a connecting rod system 47, to an intermediate drive device 49, in this case connected directly by a rigid attachment to the roof panel 15b for tilting it.

The intermediate device 49 in this case is moved exclusively by a rotation movement about a transverse axis 49a.

Advantageously, the intermediate drive device 49 comprises a tube bent near its side ends 49b, 49c in FIG. 5, and extending globally transverse to the median longitudinal plane 30, the attachment to the panel 15b therefore being made at its side ends, at 27b as already indicated. For reasons of efficiency and to limit the size, the connections at 27b between the intermediate drive tube 49 and the panel 15b will advantageously be made immediately adjacent to the rear transverse edge 15b1 of this panel that is shown in FIG. 2 as the lowest transverse edge of this panel, since in this case the panel is shown in the intermediate position in which it extends approximately vertically.

Although it is installed free to rotate about the transverse axis 49a, the tube 49 is fixed to the structural body 3 of the vehicle and in fact to the transverse beam 45, by stirrups 51 forming bearings.

Furthermore, the tube 49 passes through the guide part 42 so that it extends essentially at least over the width of the vehicle, and therefore behind the seats 31, 33.

Concerning the articulated connection between the moving part of the actuator 35 (sliding rod 37) and the intermediate drive device 49, the drive device is controlled through the above mentioned connecting rod system 47.

In fact, there are two connecting rods side by side parallel to plane 30 and each provided with a trunnion such as 53 in FIGS. 2 and 3 extending transverse to the longitudinal axis 21, each trunnion being arranged free to slide in a slide 55 curved upwards and forwards, therefore to transform the sliding movement of the rod 37 into a rotation (tilting) movement passed onto the intermediate device 49.

Thus, each connecting rod 47 is articulated at its ends through trunnions such as 53 and 57 with respect to the rod 37 and a cam 59 fixed to the intermediate part, or tube 49.

Also to facilitate quick tilting of the panel 15b, the connecting rods 47 will advantageously be bent upwards and forwards, like the slits 55.

FIGS. 2 and 3 show that the slides 55 are formed by slits in the vertical sidewalls of the fixed guidance part 42.

Now considering the mechanical strength/stiffness aspect of the vehicle, it will advantageously be noted that each side arm 23 linked to the front roof panel 15a will advantageously be linked to a longitudinal prolongation of the transverse structural beam 45 at 25b, such as the right prolongation marked 45a in FIGS. 2 and 3 for the right side of the vehicle (see left prolongation 45b, FIG. 4).

Each of the side prolongations defines an elbow with the beam 45 and extends approximately horizontal, like the beam. On each side, the prolongations are such that the beam has a horizontal flared U shape open towards the front, each prolongation thus extending towards the back of one of the doors 5 of the vehicle. Thus, each prolongation is fairly close to a side of this vehicle, close to a corresponding side of one of the said seats, such as the external side 33a of the seat 33 in FIG. 2.

Even more advantageously, it will be noted that behind each seat, the transverse structural beam 45 may be supported on upright side pillars (FIG. 5) that in particular may be in the immediate vicinity of the vehicle rear wheel arches.

Moreover, the beam 45 in this case is fixed to a hollow box 61 bearing on a structural underframe 63, and like the hollow box, is fixed to the vehicle body 3.

In each box 61 there will advantageously be a protection reinforcement 65 that will be designed to protect the vehicle occupants in the case of a shock and particularly if the vehicle overturns, like a movable roll bar.

Thus each reinforcement 65 will advantageously be installed free to slide between a low position with respect to the corresponding hollow box 61, (shown in FIG. 2) in which the reinforcement is at least partly retracted inside the box and a high position in which it extends at least partly above this box, behind the corresponding seat (position not shown).

A propulsion system, for example a pyrotechnical system, could be used to move each roll bar 65 quickly in this manner, the sidewalls of the hollow box guiding each roll bar along its vertical displacement until the top part advantageously becomes higher than the head of the occupants.

In particular, the actuator 35 may be a jack, for example a hydraulic jack or a motor driven shaft actuation system moved by an electric motor.

What is claimed is:

1. A control device for a convertible vehicle which has a longitudinal axis and a median vertical longitudinal plane parallel to said longitudinal axis and which comprises a structural body, a passenger compartment, at least two seats arranged side by side in said passenger compartment, said median vertical longitudinal plane forming a plane of symmetry on each side of which is located one of the seats, and a roof which comprises at least one roof panel movable relative to the structural body and extending in a direction transverse to said vertical longitudinal plane, wherein said control device, which is adapted for moving said at least one movable roof panel, comprises an actuator arranged and acting substantially in said median vertical longitudinal plane, the actuator being connected to said at least one movable roof panel to tilt said at least one movable roof panel.

2. The control device according to claim 1, wherein:
for being tilted, said at least one movable roof panel is actuated only by said actuator which is a single actuator.

3. The control device according to claim 1, wherein:
said two seats have seat backs, and
the actuator is arranged between the two seats in the vicinity of said seat backs.

4. The control device according to claim 1, wherein the actuator comprises a cylinder and a sliding rod sliding with respect to the cylinder, the cylinder being connected to the structural body of the vehicle, the sliding rod being articulated to an intermediate drive device which is connected to said at least one movable roof panel, to drive said at least one movable roof panel in rotation, and which is moved in rotation about an axis transverse to said vertical longitudinal plane of the vehicle.

5. The control device according to claim 4, wherein an articulated connection between the sliding rod and the intermediate drive device comprises at least one connecting rod articulated onto a cam fixed to the intermediate drive device, the connecting rod being provided with at least one trunnion extending transverse to said vertical longitudinal plane of the vehicle, the at least one trunnion being arranged free to slide along sliding means fixed in position with respect to the structural body and curved to transform the sliding movement of the sliding rod of the actuator into a tilting movement applied to the intermediate drive device.

6. The control device according to claim 4, wherein the intermediate drive device includes a tube extending generally transverse to the vertical longitudinal plane of the vehicle.

7. The control device according to claim 4, wherein the cylinder is articulated free to rotate with respect to the structural body of the vehicle about a second axis transverse to the vertical longitudinal plane of the vehicle.

8. The control device according to claim 5, wherein:
the cylinder is articulated free to rotate with respect to the structural body of the vehicle about a second axis transverse to the vertical longitudinal plane of the vehicle, and
said cylinder is fixed to a guide part with respect to which said cylinder is installed free to pivot about said second transverse axis, the guide part including said sliding means that guides said at least one trunnion.

9. The control device according to claim 1, wherein:
the roof comprises first and second movable roof panels,
the first and second movable roof panels have a front edge and a rear edge, respectively,
the second movable roof panel is articulated to the first movable roof panel about a third axis transverse to the vertical longitudinal plane of the vehicle under the control of the actuator.

10. The control device according to claim 9, wherein the second movable roof panel is connected to the structural body of the vehicle through at least one pivoting arm articulated thereto and to a part of the structural body about fourth and fifth rotation axes respectively transverse to said longitudinal plane of the vehicle.

11. The control device according to claim 6, wherein:
said at least one movable roof panel is a rear quarter panel and includes a back window of the vehicle and has a rear edge, and
the tube driven in rotation by the actuator is installed near the rear edge of said at least one movable roof panel.

12. A convertible vehicle having a longitudinal axis and a median vertical longitudinal plane parallel to said longitudinal axis and comprising:
a structural body,
a passenger compartment,
at least two seats arranged side by side in said passenger compartment, said median vertical longitudinal plane forming a plane of symmetry on each side which is located one of the seats,
a roof which comprises at least one movable roof panel movable relative to the structural body and extending in a direction transverse to said median vertical longitudinal plane, the roof being movable between a closed position above the passenger compartment and an open position reached when the roof is retracted towards a back of the passenger compartment, and
a control device for moving the roof comprising an actuator arranged and acting substantially in said median vertical longitudinal plane, the actuator being connected to said roof to tilt said roof.

13. The convertible vehicle according to claim 12, wherein the actuator comprises a cylinder and a sliding rod sliding with respect to the cylinder, said cylinder being connected to the structural body of the vehicle, the sliding rod being articulated to an intermediate drive device which is connected to said at least one movable roof panel to drive said at least one movable roof panel in rotation, and which is moved in rotation about an axis transverse to said vertical longitudinal plane of the vehicle.

14. The convertible vehicle according to claim 13, wherein the intermediate drive device controlled in rotation by the actuator is fixed behind each of said at least two seats to a structural beam that forms a part of the structural body of the vehicle and extends along an axis transverse to the vertical longitudinal plane of the vehicle.

15. The convertible vehicle according to claim 12, wherein:
the vehicle has a front edge and a rear edge, transverse to said vertical longitudinal plane,
the roof comprises first and second movable roof panels,
the first and second movable roof panels have a front edge and a rear edge, respectively,
the second movable roof panel is articulated to the first movable roof panel, about an axis transverse to the vertical longitudinal plane of the vehicle, under the control of the actuator, and
the second movable roof panel is connected to the structural body of the vehicle through at least one pivoting arm articulated thereto and to a part of the structural body, about a pair of rotation axes, transverse to said vertical longitudinal plane of the vehicle.

16. The convertible vehicle according to claim 15, wherein:
said vehicle has lateral sides on both sides of the vertical longitudinal plane,
the seats have lateral sides on both sides of said vertical longitudinal plane, and
said at least one pivoting arm is further articulated to a side extension of a structural beam extending towards the front edge of the vehicle, said side extension further extending close to one of said lateral sides of the vehicle and of one of said seats.

17. The convertible vehicle according to claim 14, wherein the structural beam behind each of said seats is fixed to a hollow box bearing on a structural underframe forming a part of the structural body of the vehicle and in which a protection reinforcement is arranged for vehicle occupants, said protection reinforcement being installed free to slide vertically with respect to the hollow box between a low position in which the protection reinforcement is at least partly retracted inside the box and a high position in which the protection reinforcement projects at least partly above the hollow box behind the corresponding seat.

18. The convertible vehicle according to claim 17, wherein the actuator comprises a cylinder and a sliding rod sliding with respect to the cylinder, the cylinder being connected to the structural body of the vehicle, the sliding rod being articulated to an intermediate drive device which is connected to said at least one movable roof panel to drive said at least one movable roof panel in rotation, and which is moved in rotation about an axis transverse to said vertical longitudinal plane of the vehicle.

19. The convertible vehicle according to claim 18, wherein the articulated connection between the sliding rod and the intermediate drive device comprises at least one connecting rod articulated onto a cam fixed to the intermediate drive device, the connecting rod being provided with trunnion means extending transverse to said vertical longitudinal plane of the vehicle, the trunnion means being arranged free to slide along sliding means fixed in position with respect to the structural body and curved to transform the sliding movement of the sliding rod of the actuator into a tilting movement applied to the intermediate drive device.

* * * * *